(12) United States Patent
Whelan (10) Patent No.: US 10,614,158 B2
(45) Date of Patent: Apr. 7, 2020

(54) METHODS AND SYSTEMS FOR STATE-BASED WEB FRAMEWORK ARCHITECTURE

(71) Applicant: The Boeing Company, Chicago, IL (US)

(72) Inventor: John Desmond Whelan, Burien, WA (US)

(73) Assignee: The Boeing Company, Chicago, IL (US)

( * ) Notice: Subject to any disclaimer, the term of this patent is extended or adjusted under 35 U.S.C. 154(b) by 682 days.

(21) Appl. No.: 15/342,797

(22) Filed: Nov. 3, 2016

(65) Prior Publication Data

US 2017/0075876 A1    Mar. 16, 2017

Related U.S. Application Data

(62) Division of application No. 13/220,102, filed on Aug. 29, 2011, now Pat. No. 9,507,871.

(51) Int. Cl.
```
G06F 17/24        (2006.01)
G06F 16/958       (2019.01)
G06F 17/21        (2006.01)
```

(52) U.S. Cl.
CPC .......... *G06F 17/247* (2013.01); *G06F 16/958* (2019.01); *G06F 17/212* (2013.01)

(58) Field of Classification Search
CPC .. G06F 17/3089; G06F 17/247; G06F 17/212; G06F 16/958
See application file for complete search history.

(56) References Cited

U.S. PATENT DOCUMENTS

| | | |
|---|---|---|
| 6,505,242 B2 | 1/2003 | Holland et al. |
| 6,507,848 B1 | 1/2003 | Crosby et al. |

(Continued)

FOREIGN PATENT DOCUMENTS

| | | |
|---|---|---|
| EP | 1156429 A2 | 11/2001 |
| EP | 2565805 A1 | 3/2013 |

(Continued)

OTHER PUBLICATIONS

JPO Office Action for related application 2012-176610 dated Nov. 22, 2016; 7 pp.

(Continued)

*Primary Examiner* — William L Bashore
*Assistant Examiner* — Gregory A Distefano
(74) *Attorney, Agent, or Firm* — Armstrong Teasdale LLP (57) ABSTRACT

A computer based method for utilizing static content in a dynamic environment to provide at least one defined functionality is described. The method includes identifying at least one function to be associated with the static content and the dynamic environment, identifying at least one state for each identified function, defining, in a computer memory, each identified state within a page object, the page object also defining within the computer memory page states and output attributes associated with output templates within the page object, creating, in the computer memory, output templates for each identified state, creating presentation pages and logic objects in the computer memory for each function, and creating engines to be executed by at least one computer processing device, each engine representing a function, the engines operable to use a corresponding page object to direct data traffic among the defined states within the computer memory.

20 Claims, 8 Drawing Sheets

(56) References Cited

U.S. PATENT DOCUMENTS

| | | | |
|---|---|---|---|
| 6,507,867 B1 | 1/2003 | Holland et al. | |
| 6,990,653 B1 | 1/2006 | Burd et al. | |
| 8,365,138 B2 * | 1/2013 | Iborra | G06F 8/30 717/104 |
| 2001/0051961 A1 | 12/2001 | Duxbury | |
| 2002/0156815 A1 | 10/2002 | Davia | |
| 2005/0138650 A1 | 6/2005 | Hon et al. | |
| 2006/0277479 A1 | 12/2006 | Britt et al. | |
| 2006/0294199 A1 | 12/2006 | Bertholf | |
| 2008/0098028 A1 | 4/2008 | Shan et al. | |
| 2009/0144759 A1 | 6/2009 | Hon et al. | |
| 2013/0055093 A1 | 2/2013 | Whelan | |

FOREIGN PATENT DOCUMENTS

| | | | |
|---|---|---|---|
| JP | 2000250841 A | 9/2000 | |
| JP | 2002041299 A | 2/2002 | |
| JP | 2009037477 A | 2/2009 | |
| JP | 2011150723 A | 8/2011 | |

OTHER PUBLICATIONS

EP Examination Report for related application 12181793.6 dated Nov. 22, 2017, 7 pp.

Notice of Rejection of Japanese Patent Application No. 2012-176610, dated Jul. 12, 2016, 7 pages.

Hori, Masahiro, Model-Based Web Application Development, Information Processing, Jan. 15, 2004, vol. 45, No. 1, pp. 16-21.

Office Action of Canadian Patent Application No. 2781481, dated Jun. 7, 2016, 4 pages.

Office Action for Canadian Patent Application No. 2781481, dated Jul. 3, 2015, 4 pages.

European Search Report of Application No. 12181793.6; dated Feb. 5, 2013; 8 pages.

Walczowski, LT. et al; Java Servlet technology for Analogue Module Generation; Proceedings of ICECS '99; 6th IEEE International Conference on Electronics, Circuits and Systems; Sep. 5-8, 1999; pp. 1717-1720; vol. 3, No. 5.

* cited by examiner

METHODS AND SYSTEMS FOR STATE-BASED WEB FRAMEWORK ARCHITECTURE

CROSS-REFERENCE TO RELATED APPLICATIONS

This application is a divisional and claims priority to U.S. patent application Ser. No. 13/220,102 filed Aug. 29, 2011 for "METHODS AND SYSTEMS FOR STATE-BASED WEB FRAMEWORK ARCHITECTURE", which is hereby incorporated by reference in its entirety.

BACKGROUND

The field of the disclosure relates generally to the hosting of applications on the internet as opposed to stand alone applications, and more specifically, to methods and systems for a state-based web framework architecture.

The inherit nature of the internet makes it difficult to present static-like information in its dynamic-like setting. In general, the internet is a platform with many advantages over traditional stand-alone applications as it provides a central location for users to collect and manipulate data. One problem, however, with the internet, is that it is too dynamic and does not present the best value when creating static-like applications.

While use of the internet is encouraged, based on all of the benefits it provides, developers are limited to its framework, which is not well suited for certain applications. For example, a simple calculator application is currently best implemented as a stand-alone application as its functionality is not exploitable within the framework that the World Wide Web provides.

The calculator application is a simple example, but illustrates the point that the web does not offer a good architecture for static-like applications such as the calculator. Other examples where the architecture of the web does not provide an optimal architecture for static-like application might include control panels, maintenance displays and remote controls. As a result, most developers overlook the internet as a possible solution when trying to tackle the types of problems encountered when tasked with development of a static-like application.

Generally, existing architectures take advantage of the dynamic nature of the internet, rather than hinder it. Other existing architectures are not as well defined and do not address this particular problem. Instead they focus on the inherit nature of the internet and work within its framework, often leading to messy and cluttered code, instead of addressing the problem clearly.

In terms of architecture itself, existing solutions do not really exist. Many are not actual architectures, but rather simple designs that happen to work within a web framework. In general, developers do not use the internet as a deployment method for static applications. However, this approach could change, as the obvious advantages the internet offers become more attractive. It is reasonable to imagine using a web browser to display a web page as a control panel. Such a representation would be transparent to the end-user.

BRIEF DESCRIPTION

In one aspect, a computer based method for utilizing static content in a dynamic environment to provide at least one defined functionality is provided. The method includes identifying at least one function to be associated with the static content and the dynamic environment, identifying at least one state for each identified function, defining, in a computer memory, each identified state within a page object, the page object also defining, within the computer memory, page states and output attributes associated with output templates within the page object, creating, in the computer memory, output templates for each identified state, creating presentation pages and logic objects in the computer memory for each function, and creating engines to be executed by at least one computer processing device, each engine representing a function, the engines operable to use a corresponding page object to direct data traffic among the defined states within the computer memory.

In another aspect, a system is provided that includes a server and at least one client communicatively coupled to the server. The system is operable to transmit, based on a user input, a request from the client to use at least one defined function hosted on the server, produce, within the server and based on the received transmission, a functionality presentation deriving from a page object within the server, and output from the server, for display on a computer display associated with the client system and via an output template within the server, the page object containing the functional presentation, the output template defining static information for each page object, a functionality engine within said server defining each piece of functionality for each page within the page object.

The features, functions, and advantages that have been discussed can be achieved independently in various embodiments or may be combined in yet other embodiments further details of which can be seen with reference to the following description and drawings.

DETAILED DESCRIPTION

The described embodiments are directed to an architecture that transforms the dynamic nature of the internet into a more static environment by using the concept of states. As a result, developers are provided with an architecture that retains the inherit benefits of the internet without losing the static-like nature of a stand-alone application. As mentioned above, the inherent nature of the internet makes it difficult to present static-like information in its dynamic-like setting. However, the internet is a platform with many advantages over traditional stand-alone applications as it provides a central location for users to collect and manipulate data. One of the problems with the internet is that it is too dynamic and does not present the best value when creating static-like applications.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

The embodiments, as described in the following paragraphs, make application coding in a dynamic environment rather simple, as a developer only needs to define the outcomes of each state within each piece of functionality. The architecture supports this by using the concept of states. States provide a static representation of a problem domain regardless of its external environment.

The following is a listing of the advantages accrued through the use of internet-based states. For example, problems are addressed through the use of states. The use of states provides a well thought out process on which to structure the design of an application. The use of states works well with problem domains not necessarily designed for the internet. The use of states is programming language independent, well defined, and easy to follow. The inherit advantages of the internet are utilized and state use is easy to implement and deploy as the content is clear, structured and consistent. Presentation and logic are divided with strong control with respects to presentation and navigation providing an excellent fit for any static-like application. As such the embodiments have a wide potential use.

Most developers overlook the internet as a possible solution when faced with developing applications along the lines of the traditional stand alone, static application. Typically, existing architectures take advantage of the dynamic nature of the internet, rather than hinder it. In general, developers do not use the internet as a deployment method for static applications. However, this approach could change, as the obvious advantages the internet offers become more attractive. It is reasonable to imagine using a web browser to display a web page as a control panel. Such a representation would be transparent to the end-user.

Figure 1:
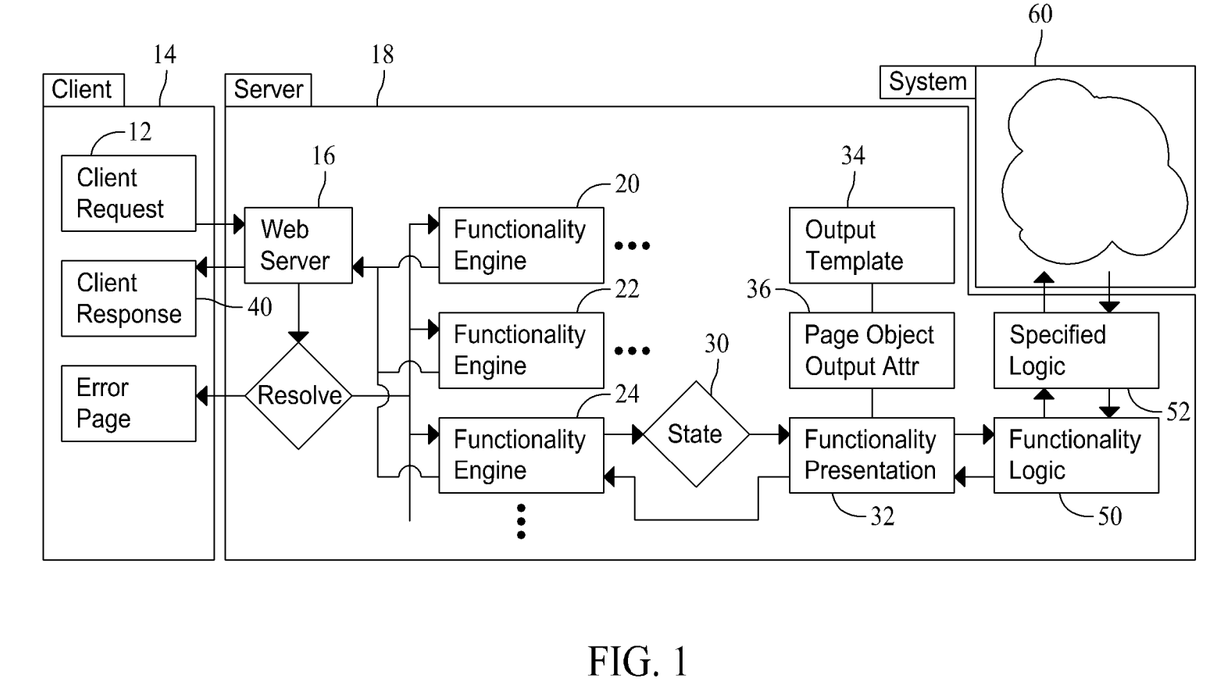
FIG. 1 is a data flow diagram that illustrates server-based functions operational within an architecture.

FIG. 1 is a data flow diagram 10 that illustrates server-based functions operational within the architecture depicted in the following paragraphs. As also further described herein, a client request 12 from computer 14 is transmitted to a web server 16 within server 18. The request is forwarded to a functionality engine 20, 22, 24, running within the server 18 depending on the nature of the request as it relates to the functionality of the architecture. The Functional engine uses a state 30 that correlates with the request received from the client and initiates the generation of a functionality presentation 32 that is eventually transferred back to the client computer 14 through the output template 34 within the Page Object 36 as a client response 40. The functionality presentation 32 derives from a page object 36 and may include functionality logic 50 to fill out the output attributes within the Page Object 36. The functionality logic 50 utilizes specified logic 52 to send commands to system 60 to calculate the dynamic output, for example, the display described with respect to the calculator example.

Figure 2:
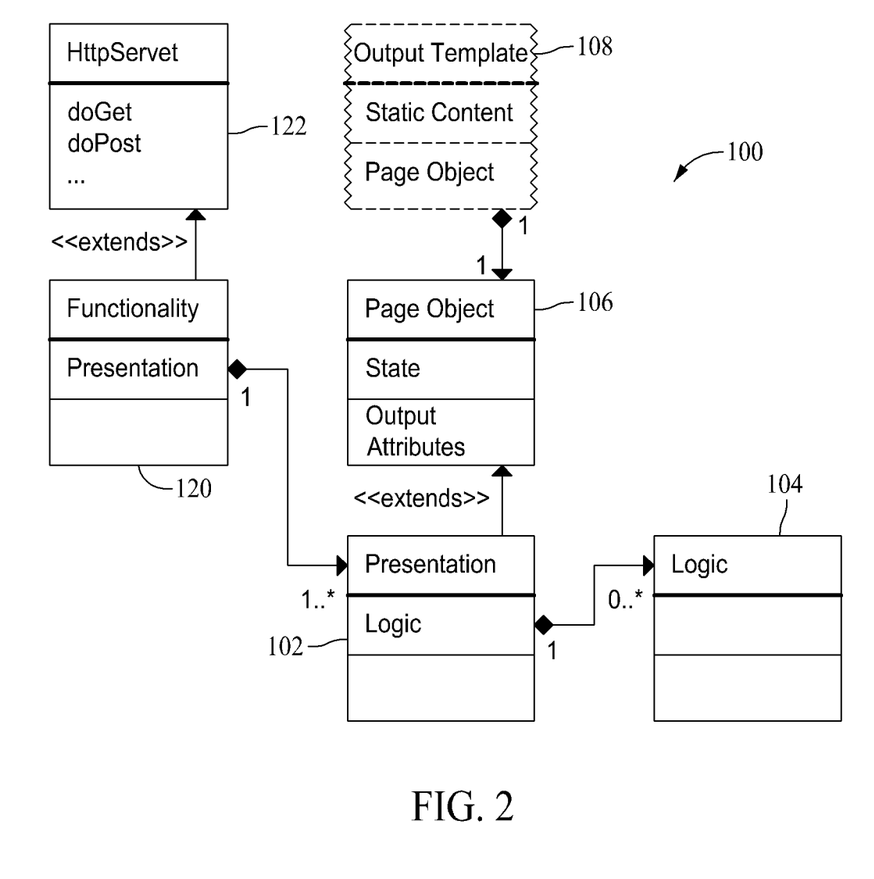
FIG. 2 is a block diagram of an architecture class diagram.

FIG. 2 is a block diagram of an architecture class diagram 100 that may be provided to developers in which the architecture retains the inherit benefits of the internet without losing the static-like nature of a stand-alone application. A presentation class 102 provides a look and feel to the application as well as possibly including a logic class or classes 104. In one example, logic class 104 includes math functions. The presentation class 102 also extends from a page object class 106, optionally defining a state, for example, Display that is presented to a user via an output template 108 as further described herein.

A functionality engine class 20 includes one or more presentation classes 102 as shown, providing a reference. The functionality engine class 120 extends from a server class 122, which provides the interface for the application to the internet.

Figure 3:
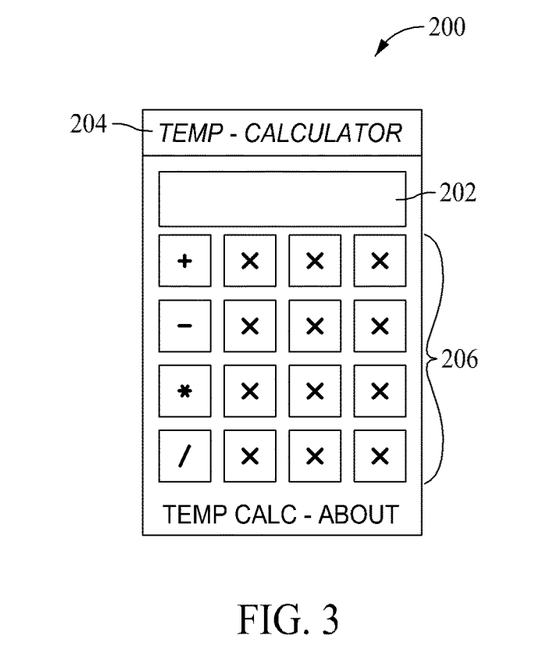
FIG. 3 is an illustration of a calculator application fabricated using the architecture classes of FIG. 2.

FIG. 3 is an example providing illustrative examples for defining static and dynamic components, particularly static and dynamic components associated with a calculator application 200. All components within the calculator application can be characterized as having either a static state or dynamic states. For example, a calculator results field 202 is an example of a dynamic component, a calculator title field 204 is an example of a static component, and a calculator keypad 206 is an example of a static component.

Figure 4:
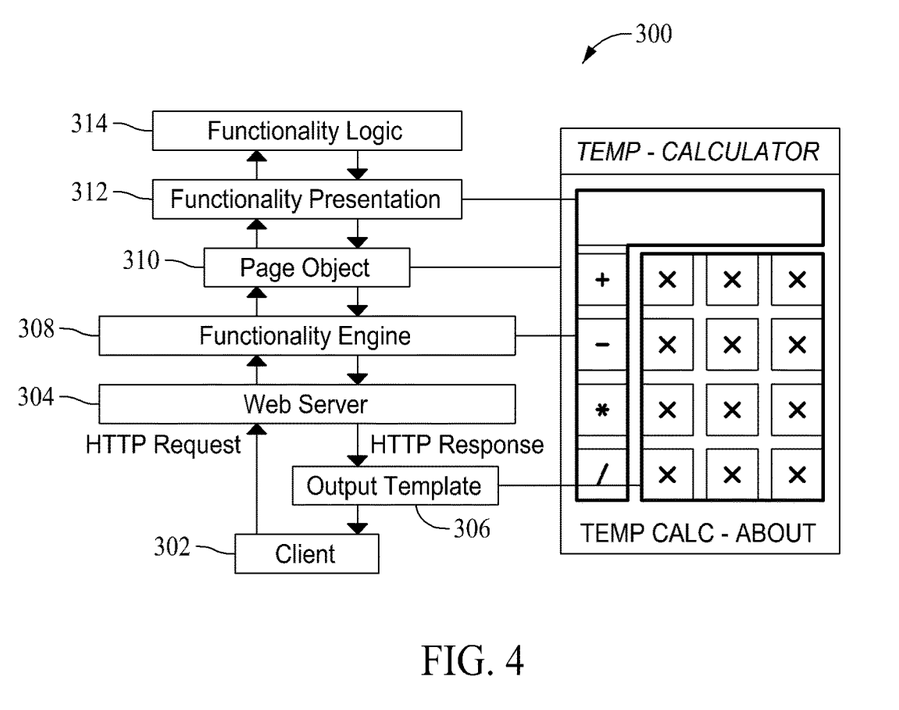
FIG. 4 is an architecture layout diagram, using the illustration of the calculator application.

FIG. 4 is an architecture layout diagram 300 that provides further illustration using the calculator application as an example. A client 302 makes a request of a web server 304. The request is sent to a functionality engine 308, which produces a functionality presentation 312 deriving from a page object 310 which might include some functionality logic 314. The page object 310, containing the functional presentation 312 is returned to the client via the output template 306. Output template 306 defines the static information for each page, for example, the numbers on a numeric keypad, as shown. A functionality engine 308 defines each piece of functionality for each page, for example, the arithmetic operators (+, *, /) on a simple calculator, as shown. A page object 310 defines the states and output attributes for each page, as shown. A functionality presentation 312 defines the output presentation for each piece of functionality, for example, the visual presentation that might result from the addition functionality, as shown. Functionality logic 314 calculates the results for each piece of functionality.

Figure 5:
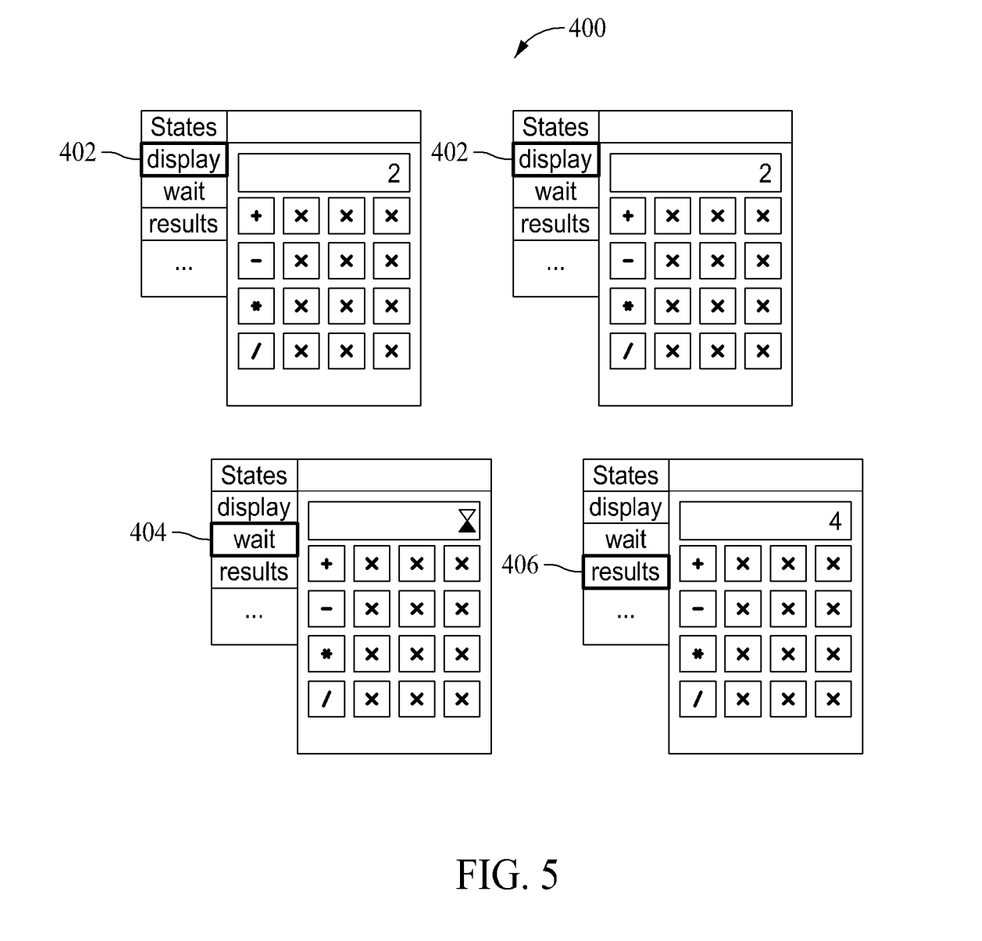
FIG. 5 is an architecture flow diagram, demonstrating the use of states, illustrated by the calculator application.

FIG. 5 is an architecture flow diagram demonstrating the use of states 400 that provides further illustration using the calculator application as an example. A user enters an input "2" representing a first operand of an equation and the state is set to "display" 402. The user then enters an input again "2" representing a second operand of the equation and the state is again set to "display" 402. The user selects a function, such as the arithmetic "+" sign, and the state changes from "display" 402 to "wait" 404. The system responds with an answer and display results in which the state changes from "wait" 404 to "results" 406. FIG. 4 represents one example how states can be used within this architecture. Each state, display, wait and results correlate with the client's request.

Figure 6:
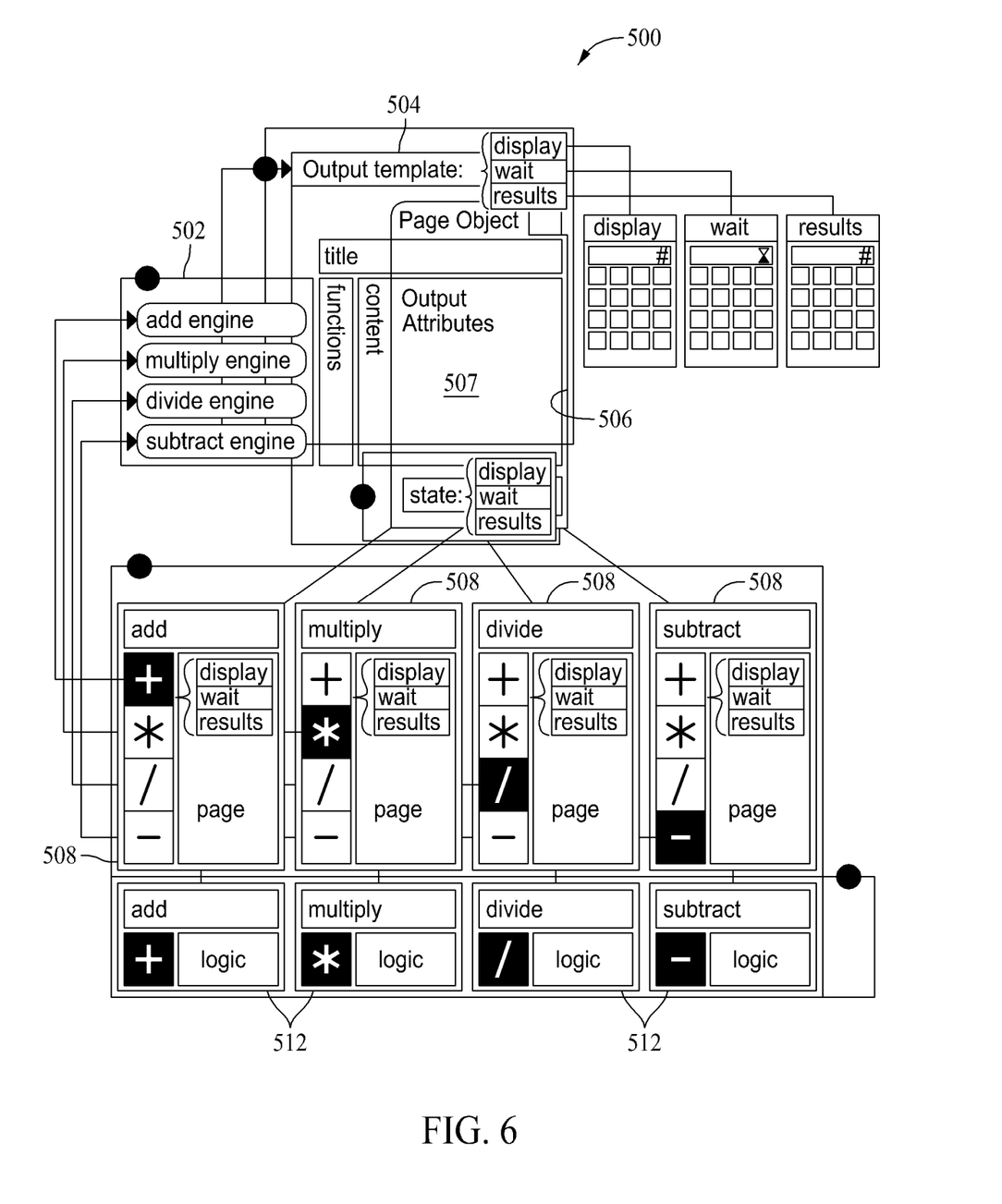
FIG. 6 is an illustration of the engines, templates, and objects utilized in the architecture depicted in FIGS. 1, 2, 4, and 5.

FIG. 6 is an illustration 500 of the architecture engines, templates, and objects that accomplish the above. For example, each functional engine 502 contains a presentation page and navigation for each corresponding state; for example, display, wait and results. When instructed to perform a task, an engine 502 returns the results of that task in an output template 504 based on its state. An output template 504 can exist for each state and holds all of the static information for that state. It is also important to note, a state may share or have more than one output template 504, allowing for a degree of flexibility. The architecture uses the output template 504 to hold static information. In the calculator example, this information includes the buttons, the screen layout and some static text. Each output template also contains or imports a page object 506.

Within the output template 504, a page object 506 contains the output attributes that carry out the functionality presentation 508, also retaining its state. The output template 504 uses the attributes from the page object 506 to fill out the active information within its page. For a calculator, this would be the information displayed in its results screen. This could also include titles and functionality that may exist for some operations, but not for others. The page object 506 defines the states and output attributes. Both states and output attributes are common to all pages, which makes sense for a static application, where it would be expected that all of the pages look the same, for example, like a control panel.

The states represent all the conditions [or states] an application can generate. For a calculator, as described above, there are three states in one specific embodiment: display, wait and results.

The page object 506 also contains the output attributes 507. These attributes define the dynamic output the user is expecting to see. In the calculator example, the output attributes 504 could include the calculated results, the current operation and a title.

The described architecture divides each piece of functionality into engines 502. These engines 502 control the web-based responses and requests (http), typically by extending this behavior from a parent class. Each engine 502 contains one or more presentation pages 508. Using the request, the engine 502 collects the information necessary for the presentation page and returns it to the client by navigating to the correct state. In the calculator example, the functionality engines would represent addition, subtraction, multiplication and division.

The functionality presentation page 508 provides results. The functionality presentation page 508 is derived from the page object 506 and provides the page object 506 with dynamic content pertaining to the results returned from presentation logic which happens within each corresponding presentation page not within the engines 502. For each piece of functionality, a functionality presentation page 508 exists. Each presentation page 508 extends the behavior of the page object 506 and can contain zero or more functionality logic objects 512. The main purpose of the functionality presentation page 508 is to create the dynamic presentation needed for each state of functionality. The functionality presentation page 508 can accomplish this by using the logic objects to fill-out each attribute extended from the Page Object. For example, with a calculator, an "addition" presentation page object would use the "addition" logic object to complete the task of adding numbers and placing the result in the calculated results field. Upon completing their tasks, the functionality presentation page 508 returns control to the engine 502 and passes the result through the page object 506, where it derives from, within an output template.

For each piece of functionality, a functionality logic object 512 can exist. These objects 512 control the logic for each piece of functionality covering each state. There is no notion of presentation in these objects, other than the fact that their results are likely to appear on a [web] page.

Figure 7:
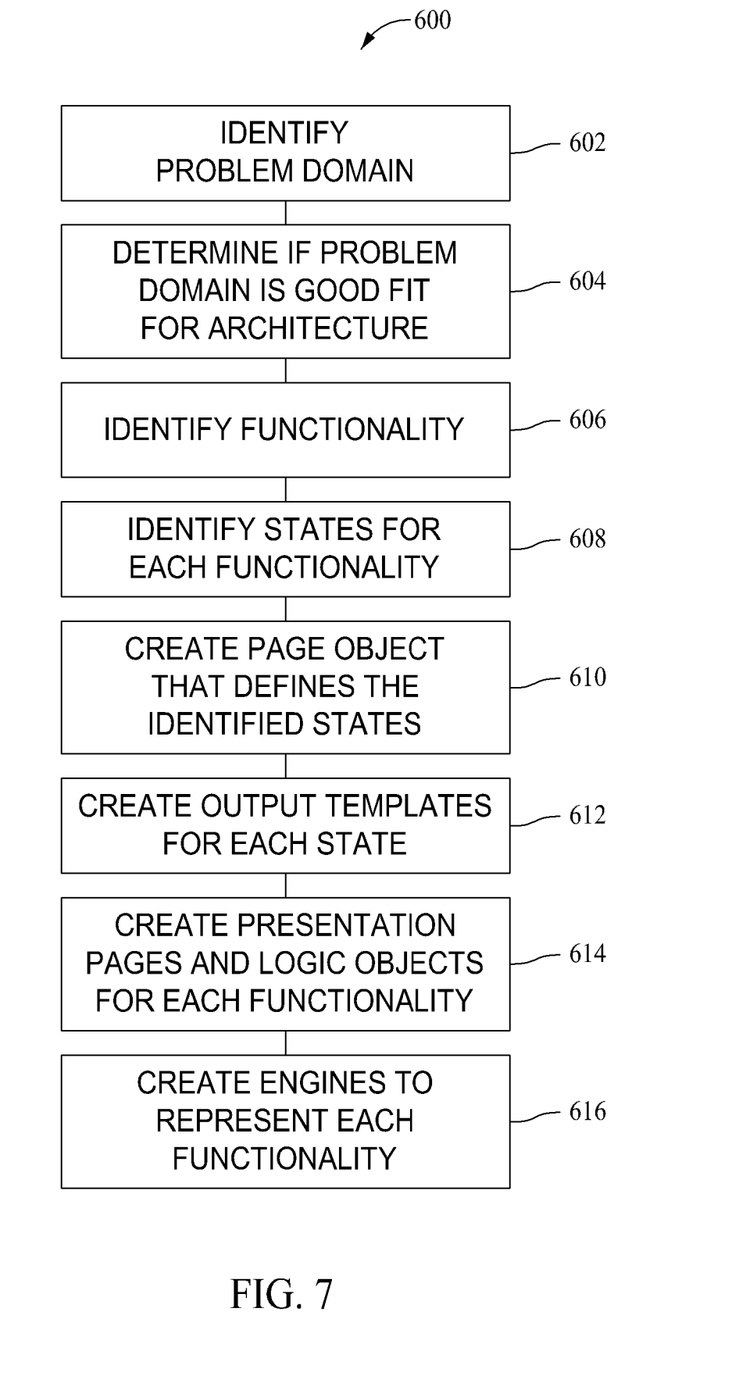
FIG. 7 is a flowchart outlining one example use of the described architecture embodiments.

In regard to the use of the described architecture embodiments, a typical use is outlined in the following paragraphs an illustrated in the flowchart 600 of FIG. 7. First, the problem domain is identified 602, for example, a simple calculator. It is then determined 604 if the problem domain is a good fit for such an architecture. In the example described herein, a simple calculator is a good fit for this architecture. Static applications with few states are a good fit for this architecture.

Functionality is identified 606. In the example of a simple calculator, that would be; add, subtract, multiple and divide. States are identified 608 for each piece of functionality. Typically, functions will share states, as is the case with a simple calculator, whose states are display, wait and results. A page object is created 610 that defines the states identified above. This page object also defines the typical page output attributes associated with its output, like a title, for instance. For the calculator example, it would simply contain the calculated results that would represent the result window you see in most calculators. Output templates are created 612 for each state, as needed, and not necessarily a one to one mapping. The calculator example includes only one template, as the output for display, wait and results would look the same.

Presentation pages and logic objects are created 614 for each piece of functionality. A functionality presentation page extends the page object, and can contain the functionality logic objects. The functionality presentation page controls the presentation for each piece of functionality, covering each state. Functionality logic objects control the logic for each piece of functionality, covering each state.

Engines are created 616 to represent each piece of functionality. Since the described architecture operates within a web framework, these engines control requests and responses on a web server [typically as Servlets or Web Applications]. Each engine uses their corresponding functionality presentation page and directs the traffic among each state. These engines control navigation and navigational logic only, not functionality or component logic.

The architecture described herein uses the concept of states to navigate each functional task. A functional task is composed of two elements, a functional presentation and its state. The architecture uses the state to direct the presentation to fulfill its task. In Table 1, shown below, "page" [note: not "Page"] represents the presentational object. In this example, "page" has three states, display, wait and results.

TABLE 1

Sample Code of a Functional Task

```
switch (page.getState ( ) ) {
    case (Page._DISPLAY) :
        page.setContent ( ) ;
        sForward = "/display.jsp";
        break;
    case (Page._WAIT) :
        page.setWaitPage ( ) ;
        sForward = "/wait.jsp";
```

TABLE 1-continued

Sample Code of a Functional Task

```
        break;
    case (Page. RESULTS) :
        page.getResults ( ) ;
        sForward = "/results.jsp";
        break;
}
```

The functional presentation extends or derives from a Page object. The page object acts as a container, holding the information needed to present to the client. The functional presentation purpose is to fill out this information as it pertains to the client's request. Table 2, shown below, demonstrates the "title" and the "main content" as the information needed to present to the user.

TABLE 2

Sample Code of a Page Object

```
public class Page
{
/** states of a page */
public static final int _DISPLAY = 0;
public static final int _WAIT = 1;
public static final int _RESULTS = 2;
/** main title of a webpage */
public String title = new String("");
/** main content */
private String main_content = "";
...
/** setMainContent - sets Main Content */
public void setMainContent (String content) {
    this.main_content = content;
}
/** getMainContent - gets Main Content */
public String getMainContent ( ) {
    return main_content;
}
}
```

The functional presentation can contain the functional logic required to fulfill each task. In Table 3, shown below, "logic" represents the logical object as it performs a refresh on the data to formulate the results.

TABLE 3

Sample Code of Functional Presentation with Functional Logic

```
public void getResults ( )
{
    super.title = "Temp Calculator";
    super.setMainContent (logic.refresh ( ) ) ;
}
```

Once the functional presentation has completed its task, the output is stored within the page object, which is contained within the output template. Each state can have its own output template that contains a page object holding the functional presentation for each task. For the examples illustrated in Tables 1-3, the output templates would be display.jsp, wait.jsp and results.jsp. In addition to the page object, these templates also hold all of the static presentation for each corresponding state. Table 4, shown below, demonstrates what a sample output template for a display state might look like.

TABLE 4

Sample Code of an Output Template

```
<%@ page import = "com.saffron.dash.Page" %>
<%
    Page pg = new Page( );
    if (request.getAttribute("PageInfo") != null ) {
        pg = ((Page) request.getAttribute("PageInfo"));
    }
%>
<html>
<BODY leftMargin=5 topMargin=1 marginwidth=1 marginheight=1 >
<table cellpadding="0" cellspacing="0" border="0" width="100%" >
<tr><td valign=top class=mtbl >
    <table align=left width=100% cellpadding=0 cellspacing=0 border=0>
        <tr><td ><img src="spacer.gif" height=5 border=0></td></tr>
        <tr><td class=act><b><%= pg.title %></b></td></tr>
        <tr><td ><img src="spacer.gif" height=15 border=0></td></tr>
        <tr><td ><img src="spacer.gif" height=5 border=0></td></tr>
        <tr><td width=100%>
            <table width=100% cellpadding=0 cellspacing=0 border=0><tr>
                <td width=100%><%= pg.getMainContent( ) %></td>
            </table></td></tr>
    </table></td></tr>
</table>
</body>
</html>
```

In one embodiment, technical effects of the methods, systems, and computer-readable media described herein include at least one of: (a) identifying at least one function to be associated with the static content and the dynamic environment, (b) identifying at least one state for each identified function, (c) defining, in a computer memory, each identified state within a page object, the page object also defining within the computer memory page states and output attributes associated with output templates containing the page object, (d) creating, in the computer memory, output templates for each identified state, (e) creating presentation pages and logic objects in the computer memory for each function, and (f) creating engines to be executed by at least one computer processing device, each engine representing a function, the engines operable to use a corresponding page object to direct data traffic among the defined states within the computer memory.

Figure 8:
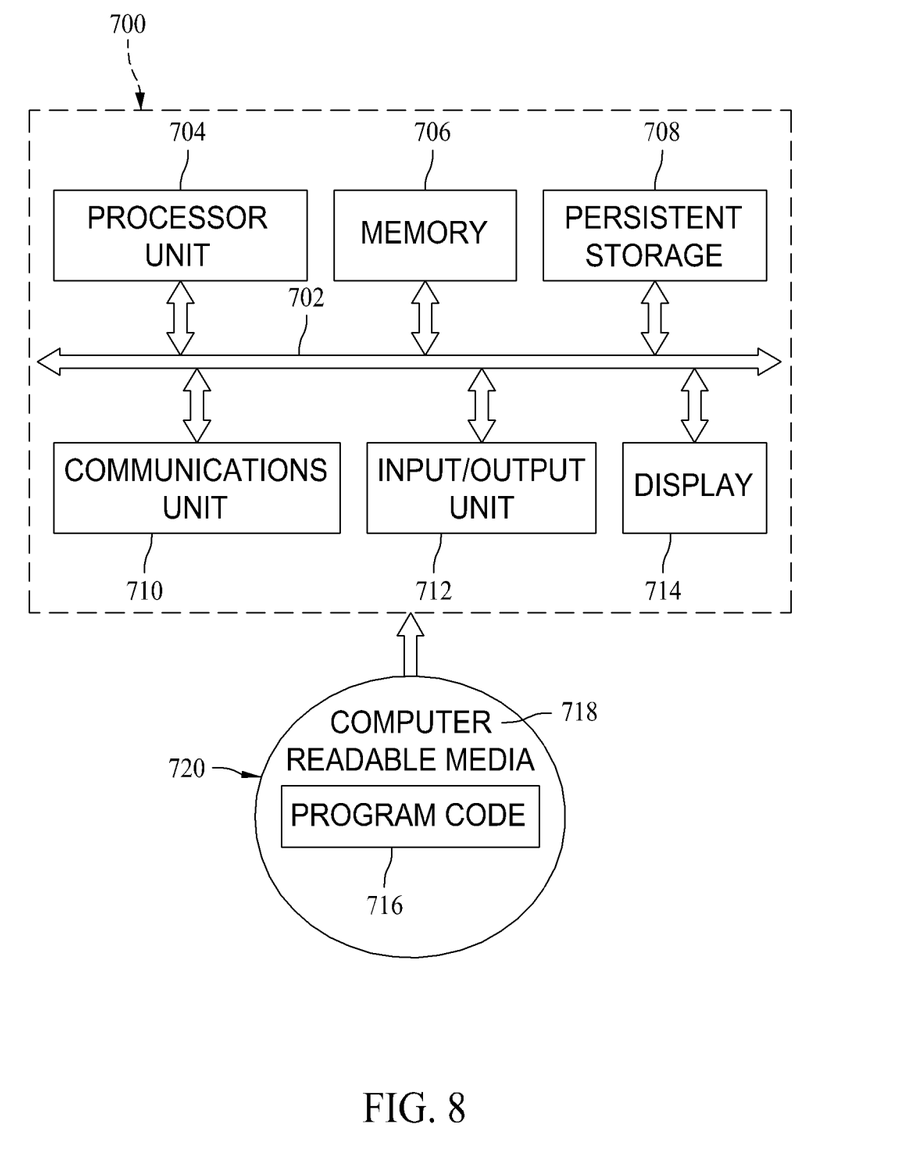
FIG. 8 is a diagram of a data processing system.

Turning now to FIG. 8, a diagram of a data processing system on which the architecture described herein might be run is depicted in accordance with an illustrative embodiment. In this illustrative example, data processing system 700 includes communications fabric 702, which provides communications between processor unit 704, memory 706, persistent storage 708, communications unit 710, input/output (I/O) unit 712, and display 714.

Processor unit 704 serves to execute instructions for software that may be loaded into memory 706. Processor unit 704 may be a set of one or more processors or may be a multi-processor core, depending on the particular implementation. Further, processor unit 704 may be implemented using one or more heterogeneous processor systems in which a main processor is present with secondary processors on a single chip. As another illustrative example, processor unit 704 may be a symmetric multi-processor system containing multiple processors of the same type.

Memory 706 and persistent storage 708 are examples of storage devices. A storage device is any piece of hardware that is capable of storing information either on a temporary basis and/or a permanent basis. Memory 706, in these examples, may be, for example, without limitation, a random access memory or any other suitable volatile or non-volatile storage device. Persistent storage 708 may take various forms depending on the particular implementation. For example, without limitation, persistent storage 708 may contain one or more components or devices. For example, persistent storage 708 may be a hard drive, a flash memory, a rewritable optical disk, a rewritable magnetic tape, or some combination of the above. The media used by persistent storage 708 also may be removable. For example, without limitation, a removable hard drive may be used for persistent storage 708.

Communications unit 710, in these examples, provides for communications with other data processing systems or devices. In these examples, communications unit 710 is a network interface card. Communications unit 710 may provide communications through the use of either or both physical and wireless communication links.

Input/output unit 712 allows for input and output of data with other devices that may be connected to data processing system 700. For example, without limitation, input/output unit 712 may provide a connection for user input through a keyboard and mouse. Further, input/output unit 712 may send output to a printer. Display 714 provides a mechanism to display information to a user.

Instructions for the operating system and applications or programs are located on persistent storage 708. These instructions may be loaded into memory 706 for execution by processor unit 704. The processes of the different embodiments may be performed by processor unit 704 using computer implemented instructions, which may be located in a memory, such as memory 706. These instructions are referred to as program code, computer usable program code, or computer readable program code that may be read and executed by a processor in processor unit 704. The program code in the different embodiments may be embodied on different physical or tangible computer readable media, such as memory 706 or persistent storage 708.

Program code 716 is located in a functional form on computer readable media 718 that is selectively removable and may be loaded onto or transferred to data processing system 700 for execution by processor unit 704. Program code 716 and computer readable media 718 form computer program product 720 in these examples. In one example, computer readable media 718 may be in a tangible form, such as, for example, an optical or magnetic disc that is inserted or placed into a drive or other device that is part of persistent storage 708 for transfer onto a storage device, such as a hard drive that is part of persistent storage 708. In a tangible form, computer readable media 718 also may take the form of a persistent storage, such as a hard drive, a thumb drive, or a flash memory that is connected to data processing system 700. The tangible form of computer readable media 718 is also referred to as computer recordable storage media. In some instances, computer readable media 718 may not be removable.

Alternatively, program code 716 may be transferred to data processing system 700 from computer readable media 718 through a communications link to communications unit 710 and/or through a connection to input/output unit 712. The communications link and/or the connection may be physical or wireless in the illustrative examples. The computer readable media also may take the form of non-tangible media, such as communications links or wireless transmissions containing the program code.

In some illustrative embodiments, program code 716 may be downloaded over a network to persistent storage 708 from another device or data processing system for use within data processing system 700. For instance, program code stored in a computer readable storage medium in a server data processing system may be downloaded over a network from the server to data processing system 700. The data processing system providing program code 716 may be a server computer, a client computer, or some other device capable of storing and transmitting program code 716.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown.

As one example, a storage device in data processing system 700 is any hardware apparatus that may store data. Memory 706, persistent storage 708 and computer readable media 718 are examples of storage devices in a tangible form.

In another example, a bus system may be used to implement communications fabric 702 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 706 or a cache such as that found in an interface and memory controller hub that may be present in communications fabric 702.

Figure 9:
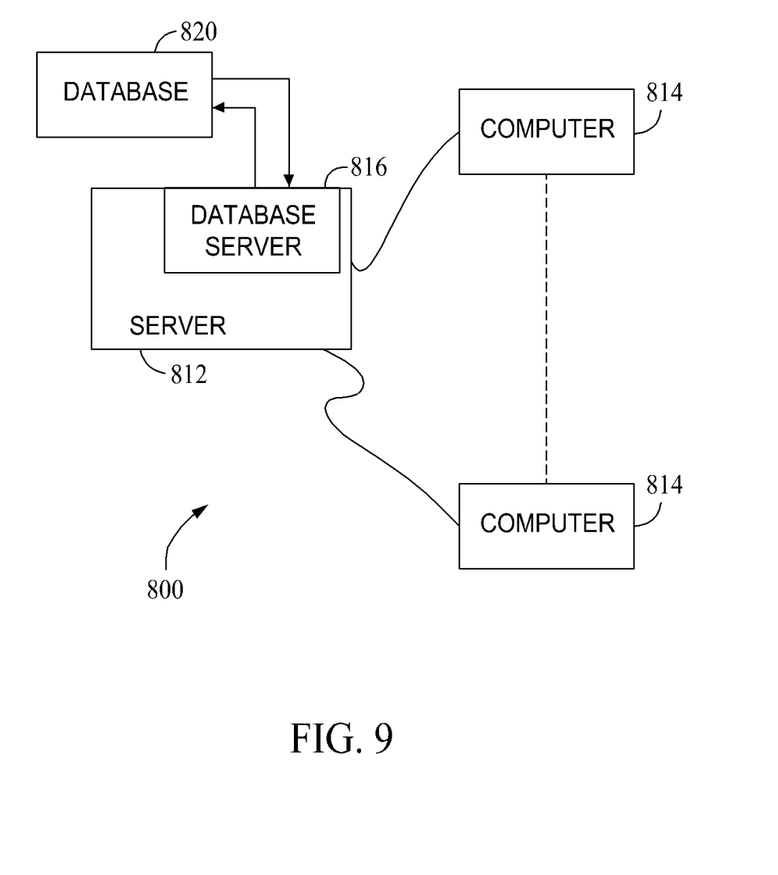
FIG. 9 is a simplified block diagram of a server architecture.

FIG. 9 is a simplified block diagram of an exemplary system 800 in accordance with one embodiment of the present invention. In one embodiment, system 800 is a payment card system used for implementing special or customized issuer-merchant relationships. In another embodiment, system 800 is a payment card system, which can be utilized by account holders for inputting promotion codes to be applied to payment transactions.

More specifically, in the example embodiment, system 800 includes a server system 812, and a plurality of client sub-systems, also referred to as client systems 814, connected to server system 812. In one embodiment, client systems 814 are computers including a web browser, such that server system 812 is accessible to client systems 814 using the Internet. Client systems 814 are interconnected to the Internet through many interfaces including a network, such as a local area network (LAN) or a wide area network (WAN), dial-in-connections, cable modems and special high-speed ISDN lines. Client systems 814 could be any device capable of interconnecting to the Internet including a web-based phone, personal digital assistant (PDA), or other web-based connectable equipment. A database server 816 is connected to a database 820 containing information on a variety of matters, as described below in greater detail. In one embodiment, centralized database 820 is stored on server system 812 and can be accessed by potential users at one of client systems 814 by logging onto server system 812 through one of client systems 814. In an alternative embodiment, database 820 is stored remotely from server system 812 and may be non-centralized.

As described herein, the architecture makes application coding in a dynamic environment rather simple, as a user just needs to define the outcomes of each state within each piece of functionality. The architecture supports this by using the concept of states. The states provide a static representation of a problem domain regardless of its external environment.

Potential cost savings provided by the described embodiments are similar to what a web application provides versus a stand-alone application and includes one or more of greater reliability, stronger and more uniform authentication, greater portability, greater accessibility, better configuration management, better use of resources, greater speed, enhanced security, better consistency among enterprise applications, and ease of deployment and installation. Manufacturers of static-like devices, such as; control panels, maintenance devices, remote controls and such will benefit from using the described embodiments. However, there isn't a well defined architecture to support that use. The described architecture embodiments provide a straightforward layout for developers to use, while promoting consistency throughout an enterprise. Having a uniform architecture behind every static-like application would make developers more efficient, for example, by improving development costs as the architecture is already streamlined and validated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-based method for utilizing static content in a dynamic environment to provide at least one defining functionality, said method comprising:
    identifying at least one function to be associated with the static content and the dynamic environment;
    identifying at least one state for each identified function;
    defining, in a computer memory, each identified state within a page object, the page object also defining, within the computer memory, page states and output attributes associated with output templates within the page object;
    creating, in the computer memory, output templates for each identified state;
    creating presentation pages and logic objects in the computer memory for each function including dynamic results of the corresponding function based on each identified state, wherein the logic object executes the function in accordance with the identified state; and
    creating engines to be executed by at least one computer processing device, each engine representing a function, the engines operable to use a corresponding page object to direct data traffic among the defined states within the computer memory.

2. The computer-based method according to claim 1 further comprising using the engines to return results of a function in an output template based on the state.

3. The computer-based method according to claim 1 wherein creating output templates for each identified state comprises configuring the output templates to hold all static information for the state.

4. The computer-based method according to claim 1 wherein creating output templates for each identified state comprises at least one of:
    configuring one or more of the identified states to share a created output template; and
    configuring one or more of the identified states to utilize a plurality of the created output templates.

5. The computer-based method according to claim 1 wherein creating output templates for each identified state comprises configuring each output template to contain or import a page object.

6. The computer-based method according to claim 1 wherein creating output templates for each identified state comprises configuring the output template with one of the page objects that contains output attributes for retaining a state of the output template.

7. The computer-based method according to claim 6 further comprising using attributes from the page object to fill out active information within the presentation page associated with the output template.

8. The computer-based method according to claim 1 wherein the output attributes define a dynamic output for presentation to a user.

9. The computer-based method according to claim 1 further comprising executing the engines to:
    collect information needed for a presentation page; and
    navigate control to a corresponding page object for each corresponding state.

10. The computer-based method according to claim 1 further comprising using the presentation pages to provide results derived from the page objects and provide the page objects with dynamic content pertaining to results received from the logic objects.

11. A computer device for utilizing static content in a dynamic environment to provide at least one defining functionality, said computer device comprising a processor in communication with a memory device, said processor programmed to:
    identify at least one function to be associated with the static content and the dynamic environment;
    identify at least one state for each identified function;
    define each identified state within a page object, the page object also defining, within said memory device, page states and output attributes associated with output templates within the page object;
    create output templates for each identified state;
    create presentation pages and logic objects in said memory device for each function including dynamic results of the corresponding function based on each identified state, wherein the logic object executes the function in accordance with the identified state; and
    create engines to be executed by said processor, each engine representing a function, the engines operable to use a corresponding page object to direct data traffic among the defined states within said memory device.

12. The computer device according to claim 11, wherein the processor is further programmed to use the engines to return results of a function in an output template based on the state.

13. The computer device according to claim 11, wherein the processor is further programmed to configure the output templates to hold all static information for the state.

14. The computer device according to claim 11, wherein the processor is further programmed to:
    configure one or more of the identified states to share a created output template; and
    configure one or more of the identified states to utilize a plurality of the created output templates.

15. The computer device according to claim 11, wherein the processor is further programmed to configure each output template to contain or import a page object.

16. The computer device according to claim 11, wherein the processor is further programmed to configure the output template with one of the page objects that contains output attributes for retaining a state of the output template.

17. The computer device according to claim 16, wherein the processor is further programmed to use attributes from the page object to fill out active information within the presentation page associated with the output template.

18. The computer device according to claim 11, wherein the output attributes define a dynamic output for presentation to a user.

19. The computer device according to claim 11, wherein the processor is further programmed to use the presentation pages to provide results derived from the page objects and provide the page objects with dynamic content pertaining to results received from the logic objects.

20. At least one non-transitory computer-readable storage media having computer-executable instructions embodied thereon, wherein when executed by a computing device having at least one processor coupled to at least one memory device, the computer-executable instructions cause the processor to:
- identify at least one function to be associated with a static content and a dynamic environment;
- identify at least one state for each identified function;
- define each identified state within a page object, the page object also defining, within the memory device, page states and output attributes associated with output templates within the page object;
- create output templates for each identified state;
- create presentation pages and logic objects in the memory device for each function including dynamic results of the corresponding function based on each identified state, wherein the logic object executes the function in accordance with the identified state; and
- create engines to be executed by the processor, each engine representing a function, the engines operable to use a corresponding page object to direct data traffic among the defined states within the memory device.

* * * * *